United States Patent [19]

Bonomo

[11] 4,005,907
[45] Feb. 1, 1977

[54] DUAL WHEEL MOUNTING ASSEMBLIES

[75] Inventor: Melvin E. Bonomo, Sandusky, Ohio

[73] Assignee: Unverferth Manufacturing Company, Inc., Kalida, Ohio

[22] Filed: Feb. 7, 1973

[21] Appl. No.: 330,195

[52] U.S. Cl. .............................. 301/36 R; 301/40 S
[51] Int. Cl.² .......................................... B60B 11/02
[58] Field of Search ............ 301/39 R, 39 T, 39 C, 301/39 S, 36 R, 38 R, 40 R, 40 S, 41 R

[56] References Cited

UNITED STATES PATENTS

| 3,328,088 | 6/1967 | Olson | 301/39 R |
| 3,464,739 | 9/1969 | Johnson | 301/39 R |
| 3,713,701 | 1/1973 | Penner | 301/39 R |

Primary Examiner—Trygve M. Blix
Assistant Examiner—Reinhard J. Eisenzopf
Attorney, Agent, or Firm—Allegretti, Newitt, Witcoff & McAndrews

[57] ABSTRACT

A wheel mounting assembly for mounting an auxiliary wheel to a vehicle wheel includes an annular ring which is positioned in a stepped groove adjacent an edge of the rim of the auxiliary wheel and a lug member which is formed integrally with the ring and which overlies and contacts the rim of the auxiliary wheel. In one embodiment of the invention, a hooked member extends from the ring and hooks underneath the rim of the auxiliary wheel to counterbalance the forces exerted on the ring and rim when the connecting member which connects the auxiliary wheel with the vehicle mounted wheel is tensioned. In another embodiment of the invention, spokes extend between diametrically opposite lug members to counterbalance forces exerted upon the ring and rim when the connecting member is tensioned.

5 Claims, 5 Drawing Figures

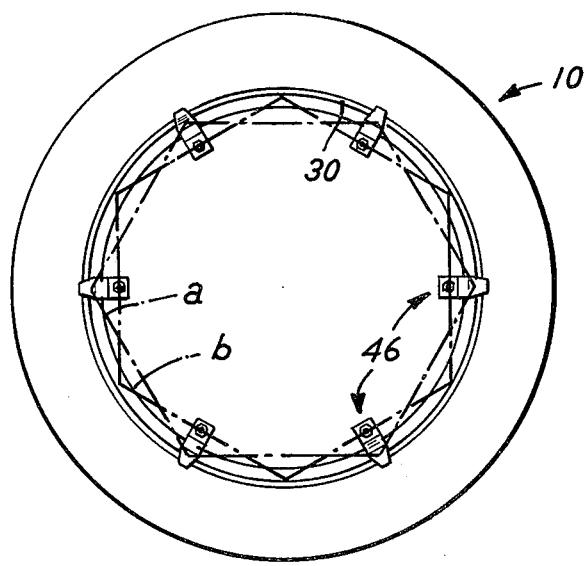
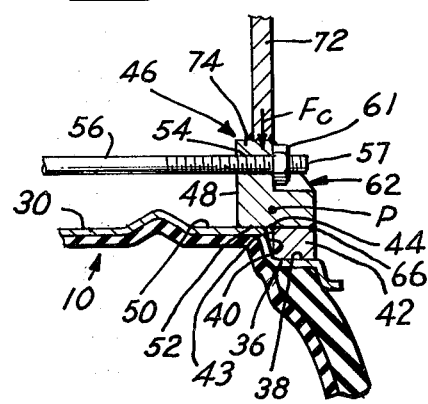
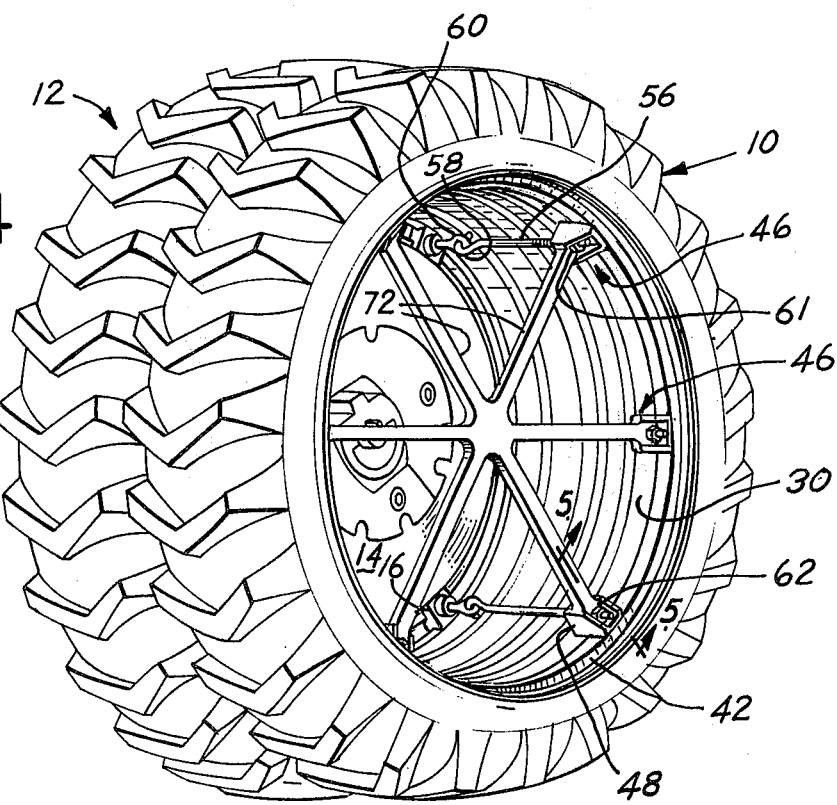

DUAL WHEEL MOUNTING ASSEMBLIES

BACKGROUND AND SUMMARY OF THE INVENTION

This invention relates to a dual wheel mounting assembly and, more particularly, to an assembly for attaching an auxiliary wheel to another vehicle mounted wheel.

In the past, various wheel mounting assemblies have been employed for attaching auxiliary wheels to primary wheels already mounted on a vehicle axle to improve traction and the like. One such prior assembly has taken the form of an annular ring which fits in an annular stepped edge groove about the internal perimeter of the rim of the auxiliary wheel. To this ring are attached a plurality of angularly spaced lug members or brackets which extend in overlying relationship to and bear against the auxiliary wheel rim. Elongated connecting rods or the like are hooked or otherwise secured to the primary vehicle mounted wheel and to the lug members or brackets and a suitable tensioning means, such as a nut, is threaded upon the end of the connecting rod to draw a tension on the connecting rod between the primary vehicle wheel and the lug member or bracket to secure the wheels together.

Such prior annular ring assemblies suffer the disadvantage that both during tensioning, and even more important, during use of the vehicle, stresses arise which tend to "square" the auxiliary wheel ring and/or the annular mounting ring. Such squaring frequently leads to unacceptable deformation of one or both of these latter mentioned members and to the possibility of the annular ring slipping over the auxiliary wheel ring. When the latter occurs, the auxiliary wheel along with the mounting assembly may separate from the vehicle mounted wheel.

The present invention is directed to an improvement in such annular ring mounting assemblies which substantially overcomes the tendency in such assemblies to square with the accompanying possibility of rim deformation and wheel separation which may result therefrom. In the dual wheel mounting assembly of the present invention, means are provided to exert a counterbalancing force which minimizes the forces exerted upon the auxiliary wheel rim, either during tensioning, use or both, by the mounting assembly when the wheels have been attached together. The dual wheel mounting assembly of the present invention not only obviates the tendency of squaring of the mounting assembly itself and/or the auxiliary wheel rim, but is capable of easy manufacture and also a reduction in the amount and/or strength of the materials which were previously necessary in prior annular ring mounting assemblies. Finally, in the present invention the dual wheel mounting assembly may be protected against damage during use and is capable of assembly without the need to hammer or forcibly compress the assembly in place or pry the assembly loose when the auxiliary wheel is to be demounted.

In a principal aspect of the invention, a wheel mounting assembly for mounting an auxiliary wheel to a vehicle mounted wheel includes an auxiliary wheel rim having an annular stepped groove adjacent an edge of the rim and wheel securing means including an annular ring positioned in the stepped groove and a plurality of spaced lug members spaced about the inner circumference of the annular ring. A portion of each of the lug members extends beyond the ring and in overlying contacting relationship with the rim of the auxiliary wheel. Connecting means is adapted to be attached between the vehicle mounted wheel and the lug members and tension means draw a tension on the connecting means to firmly atttach the wheels together. The improvement in this assembly includes means which relieves stresses on the auxiliary wheel rim and the ring by exerting a counterbalancing force on the securing means toward the rim of the auxiliary wheel, which counterbalances the force exerted upon the rim by the overlying portions of the lug members when the auxiliary and vehicle mounted wheels are attached together.

In one principal embodiment of the present invention, the means for exerting this counterbalancing force comprises a hooked member which extends from the securing means and hooks beneath the rim of the auxiliary wheel.

In another principal embodiment of the present invention, the means for exerting this counterbalancing force comprise spokes.

These and other objects, features and advantages of the present invention will become evident upon consideration of the following detailed description.

BRIEF DESCRIPTION OF THE DRAWINGS

In the course of this detailed description, the drawings will frequently be referred to in which:

FIG. 3 is a schematic side elevation view of a mounted auxiliary wheel showing the tendency to square which the present invention substantially overcomes;

FIG. 4 is an overall view of a pair of vehicle wheels mounted together by a spoke embodiment of wheel mounting assembly constructed in accordance with the principles of the present invention; and FIG. 5 is an enlarged broken cross sectioned elevation view of an auxiliary wheel and the spoke embodiment of wheel mounting assembly taken substantially along lines 5 — 5 of FIG. 4.

DETAILED DESCRIPTION OF THE PREFERRED EMBODIMENTS

Figure 1:
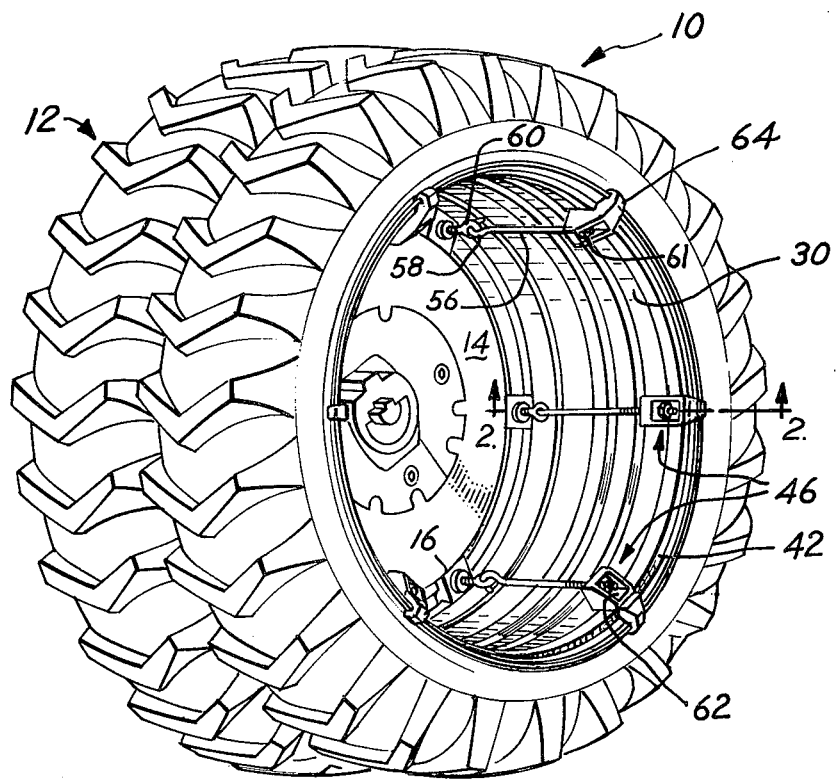
FIG. 1 is an overall view of a pair of vehicle wheels mounted together by a hooked embodiment of wheel mounting assembly constructed in accordance with the principles of the present invention.
Figure 2:
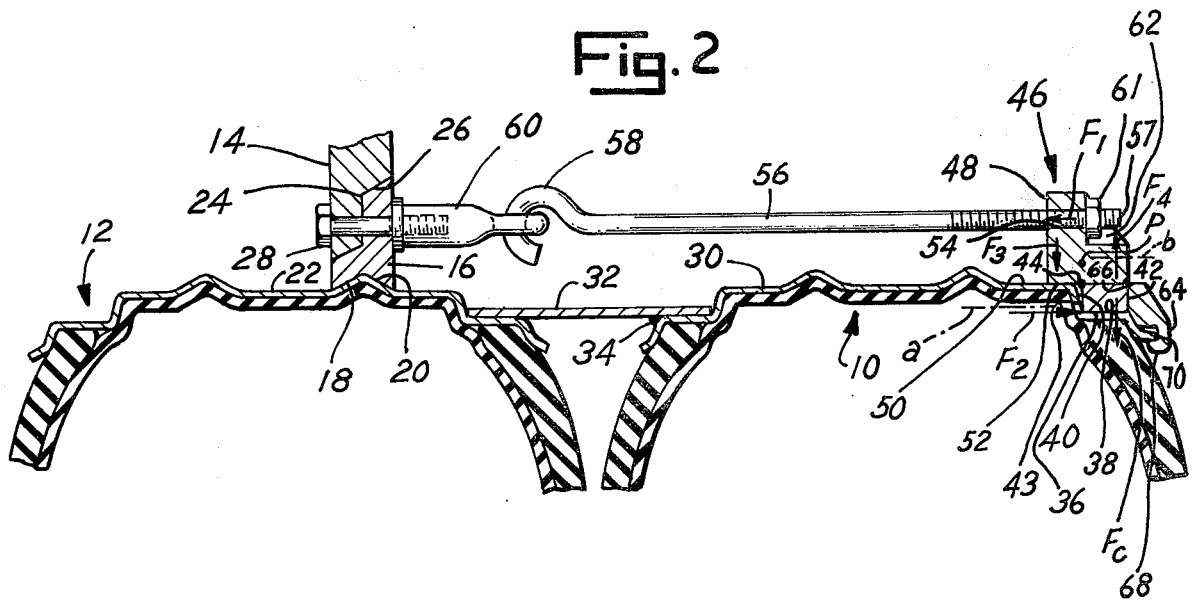
FIG. 2 is an enlarged broken cross sectioned elevation view of the wheels and hooked embodiment of wheel mounting assembly of the present invention taken substantially along line 2 — 2 of FIG. 1.

Referring to FIGS. 1 and 2, a first preferred embodiment of wheel mounting assembly is shown for attaching an auxiliary vehicle wheel 10 to a primary vehicle wheel 12, the latter wheel being mounted on the axle of a vehicle, such as a tractor. In a conventional manner, the primary wheel 12 is attached to the hub 14 of the axle by a plurality of mounting lugs 16. Each lug includes a notched end 18 which is adapted to fit over an annular rib 20 about the inner circumference 22 of the primary wheel rim and an inclined stepped surface 24 is arranged to be drawn into wedged relationship with a similar inclined surface 26 provided about the periphery of the axle hub 14 when the lug and hub are drawn together with a bolt 28. The auxiliary vehicle wheel 10 which is to be mounted to the primary wheel 12 also includes a wheel rim 30 and a tire similar in construction to the primary wheel, and a spacer member 32 is provided which is preferably welded at 34 to the auxiliary wheel rim 30 for spacing the wheels from each other by a predetermined distance.

Referring particularly to FIG. 2, an annular stepped groove 36 is provided adjacent the outer edge of the auxiliary wheel rim 30 opposite the vehicle mounted wheel 12. This groove includes a substantially horizontal surface 38 which faces the axis of the auxiliary wheel and a vertical surface 40 which faces outward from the wheel. An annular ring 42, formed of a solid strong material, such as steel, is received in the stepped annular groove 36. The external diameter of the ring 42 is preferably slightly smaller than the distance between diametrically opposite points on the surface 38 of the annular groove in order to facilitate easy positioning of the annular ring into the groove without necessitating hammering or the like and also removal from the groove without the need for prying. Although the annular ring 42 is not compressed radially in the groove, the diameter of the annular ring is sufficiently large so that when the ring is positioned in the stepped groove, the principal part of its left hand face 43, as viewed in FIG. 2, will bear against and be retained against the substantially vertical surface 40 of the stepped annular groove.

Attached in angularly spaced relationship about the annular ring 42, as by welding at 44, are a plurality of lug members 46. Both the number and spacing of the lug members 46 is preferably identical to the number and position of locations on the primary vehicle wheel 12 to which the auxiliary wheel 10 is to be attached. Each lug member 46 preferably includes a strong cast metal block 48 which is integrally welded to the ring at 44 and one side of each of these lug members extends beyond the ring and is adapted to be positioned in overlying relationship with the inner surface 50 of the auxiliary wheel rim 30. When the annular ring with its lug members has been positioned in the slotted groove 36, as shown in FIG. 2, the lower surface 52 of this overlying portion of the lug member will bear against the surface 50 of the auxiliary wheel rim.

Each of the lug members 46 also includes, for example, an aperture 54 which extends through the lug members in a direction substantially parallel to the axis of rotation of the wheels. An elongate connecting rod 56 extends through aperture 54 at one end 57 and the other end is preferably formed as a hook 58. Hook 58 is hooked through an eye bolt 60 which, in turn, is secured to the bolts 28 such as by threading thereon. The end 57 of rod 56 is threaded to receive a suitable tension nut 61 for drawing a tension on rod 56 and the lug members are preferably recessed at 62 such that neither the end 57 of the connecting rod nor the nut 61 extend beyond the outer side wall of the auxiliary wheel when the auxiliary wheel has been mounted to the primary wheel. This is important for preventing damage to the dual wheel mounting assembly which may otherwise result if the connecting rod and/or tension nut extended beyond the exterior side wall of the auxiliary wheel. If such protrusion existed, these members would be susceptible to contact with door frames and other upstanding rigid vertical structures which could result in damage to either or both.

In the mounting assembly thus far described, the auxiliary wheel rim 30 and/or annular ring 42 will tend to square upon tensioning of the nut 61 and/or from excessive forces exerted upon the auxiliary wheel during operation, particularly where the vehicle is to be operated in rugged terrain. This tendency to square is schematically depicted in FIG. 3 and is the result of the forces exerted by and through the lug members, both during tensioning and use. Referring to FIG. 2, upon tensioning of the connecting rods 56 for example, the lug members 46 will tend to rotate upon a pivot axis P in a counterclockwise direction due to force $F_1$ which is exerted along the connecting rod. Since force $F_1$ is spaced from the pivot axis P, a mechanical couple will be set up by force $F_1$ and an equal and opposite force $F_2$ will be exerted by contact between surface 40 of the annular groove against the side 43 of the annular ring. It will be seen that force couple $F_1$ and $F_2$ will give rise to still another force $F_3$ which will be exerted downward by the lower edge 52 of the lug members which bear against the surface 50 of the auxiliary wheel rim. Also a force $F_4$ will be exerted in the opposite direction and will tend to pull upward upon the annular ring 42. Force couple $F_3$ and $F_4$ thereby will cause the auxiliary wheel rim to tend to peak outward adjacent the lug members 46 so as to assume a shape as generally depicted in the dot and dash lines $a$ shown in FIGS. 2 and 3 and will also cause the annular ring 42 to tend to peak inward adjacent the lug members as generally depicted by the dot and dash lines $b$. Thus, it will be seen that there is a tendency for both the auxiliary wheel rim and the annular ring to square and, worse yet, in an out of phase relationship as shown in FIG. 3. If the magnitude of this squaring is great enough that the internal edge of the annular ring passes beyond the projection of surface 50 of the rim 30, the auxiliary wheel will no longer be firmly held and may become detached.

The present invention prevents any substantial amount of such squaring by exerting a counterbalancing force $F_c$ which is directed toward the rim 30, as shown in FIG. 2 and which counterbalances the couple about the pivot P such as to minimize the effect of the squaring force couples $F_3$ and $F_4$.

In the embodiment shown in FIGS. 1 and 2, this counterbalancing force $F_c$ is generated by a plurality of hooked members 64 which are integrally fixed to the annular ring 42 adjacent each of the lug members 46, as by welding at 66. Each of the hooked members 64 includes a hooked finger 68 which is adapted to hook beneath the edge 70 of the auxiliary rim 30, as shown in FIG. 2 such that counterclockwise rotation as viewed in FIG. 2 will be restrained.

The embodiment of invention shown in FIGS. 4 and 5 is substantially indentical to the embodiment shown in FIGS. 1 and 2, except that the hooked members 64 have been replaced by a plurality of spokes 72 which bear against the tops 74 of diametrically opposite ones of the lug members 46 and toward the rim. Thus, it will be seen that any tendency of the lug members to rotate in a counterclockwise direction as viewed in FIG. 5 will be counterbalanced by the force $F_c$ which is exerted downward upon the respective lug members by the spokes 72.

Since the embodiments shown in FIGS. 1-2 and 4-5 are substantially identical to each other, except for the means for generating the counterbalancing force, like reference numerals have been employed to designate like components.

It should be understood that the embodiments of the present invention which have been described are merely illustrative of some of the applications of the principles of the invention. Numerous modifications may be made by those skilled in the art without departing from the true spirit and scope of the invention.

What is claimed is:

1. A wheel mounting assembly for mounting an auxiliary wheel to a vehicle-mounted wheel, said assembly comprising, a rim on the auxiliary wheel, an annular stepped groove adjacent an edge of said rim opposite the vehicle-mounted wheel, wheel securing means including an annular ring positioned in said stepped groove, and a plurality of spaced lug members and rim contacting means secured to and spaced about the inner circumference of said annular ring, each of said rim contacting means having a portion thereof extending beyond said ring and in overlying and contacting relationship with the rim of said auxiliary wheel between said stepped groove and the vehicle-mounted wheel, connecting means adapted to be attached at one end to the vehicle-mounted wheel and at its other end to said lug members, and tension means for drawing tension on said connecting means to firmly attach the wheels together, wherein the improvement in said assembly includes means in combination therewith for relieving stresses on said auxiliary wheel rim and said ring, said stress relieving means including:

means for exerting a counterbalancing force on said securing means in a direction toward the rim of said auxiliary wheel, said force counterbalancing the forces exerted upon the rim by said rim contacting means and upon the ring and which tend to deform said rim and ring in opposed directions when said auxiliary wheel is attached to said vehicle-mounted wheel, said means for exerting said counterbalancing force comprising a plurality of spokes in the annular opening of the rim of said auxiliary wheel, said spokes bracing said securing means between first points adjacent said lug members and second points angularly displaced from said first points about the rim of said auxiliary wheel.

2. The assembly of claim 1 wherein said connecting means and said tension means terminate short of the side of said auxiliary wheel opposite said vehicle-mounted wheel.

3. The assembly of claim 1 wherein said spokes extend between diametrically opposed ones of said lug members.

4. The assembly of claim 1 wherein the diameter of said annular ring is slightly less than the diameter of said annular stepped groove, whereby said ring may be loosely positioned in said groove.

5. The assembly of claim 1 wherein said rim contacting means comprise a portion of said lug members extending beyond said ring in overlying relation to said rim.

* * * * *